US010248434B2

(12) United States Patent
Goodman et al.

(10) Patent No.: US 10,248,434 B2
(45) Date of Patent: Apr. 2, 2019

(54) LAUNCHING AN APPLICATION

(71) Applicant: BlackBerry Limited, Waterloo (CA)

(72) Inventors: Kevin Dennis Goodman, Nepean (CA); Peter McKinnon, Ottawa (CA); Petr Nejedly, Redwood City, CA (US)

(73) Assignee: BlackBerry Limited, Waterloo, Ontario ( * ) Notice: Subject to any disclaimer, the term of this patent is extended or adjusted under 35 U.S.C. 154(b) by 89 days.

(21) Appl. No.: 14/935,304

(22) Filed: Nov. 6, 2015

(65) Prior Publication Data

US 2017/0115994 A1 Apr. 27, 2017

Related U.S. Application Data

(60) Provisional application No. 62/247,141, filed on Oct. 27, 2015.

(51) Int. Cl.
*G06F 9/445* (2018.01)
*G06F 9/54* (2006.01)
*G06F 12/14* (2006.01)

(52) U.S. Cl.
CPC ............... *G06F 9/445* (2013.01); *G06F 9/54* (2013.01); *G06F 12/1408* (2013.01)

(58) Field of Classification Search
CPC .................................. G06F 9/445; G06F 9/54
See application file for complete search history.

(56) References Cited

U.S. PATENT DOCUMENTS 9,152,694 B1* 10/2015 Padidar ............. G06F 17/30598
9,336,386 B1* 5/2016 Qu ........................ G06F 21/55
2008/0028180 A1* 1/2008 Newman ............. G06F 12/1416
711/206
2009/0178056 A1* 7/2009 Koeth ...................... G06F 9/54
719/311
2015/0294114 A1* 10/2015 Monahan ................. G06F 8/41
726/26
2015/0302195 A1* 10/2015 Acar ...................... G06F 21/54
726/23

OTHER PUBLICATIONS

Lee, B. et al.; "From Zygote to Morula: Fortifying Weakened ASLR on Android"; 2014 IEEE Symposium on Security and Privacy; May 18, 2014; pp. 424-439.
Extended European Search Report issued in European Application No. 15198550.1 dated May 30, 2016.
Lee et al., "From Zygote to Morula: Fortifying Weakened ASLR on Android", conference proceeding SP'14 of 2014 IEEE Symposium on Security and Privacy, pp. 424-439, IEEE Computer Society, Washington DC May 18-21, 2014.
Communication Pursuant to Article 94(3) EPC issued in European Application No. 15198550.1 dated Dec. 22, 2017; 7 pages.

* cited by examiner

*Primary Examiner* — Umut Onat
(74) *Attorney, Agent, or Firm* — Fish & Richardson P.C.

(57) ABSTRACT

Systems, methods, and software can be used to launch an application. In some aspects, a plurality of process classes is configured. Each of the plurality of process classes includes one or more applications. Each of the process classes is configured to be associated with a template process. Each template process is associated with a different randomized memory layout. A launch request for an application is received. A process class that is associated with the application is determined in response to the launching request. The application is launched using the template process associated with the determined process class.

20 Claims, 2 Drawing Sheets

LAUNCHING AN APPLICATION

CROSS REFERENCE TO RELATED APPLICATIONS

This application claims the benefit of priority of U.S. Application Ser. No. 62/247,141, filed on Oct. 27, 2015, which is incorporated by reference herein in its entirety.

BACKGROUND

The present disclosure relates to launching an application. In some cases, an application can be launched by instantiating an instance of the application in the operating system of an electronic device.

DESCRIPTION OF DRAWINGS

Like reference numbers and designations in the various drawings indicate like elements.

DETAILED DESCRIPTION

Figure 1:
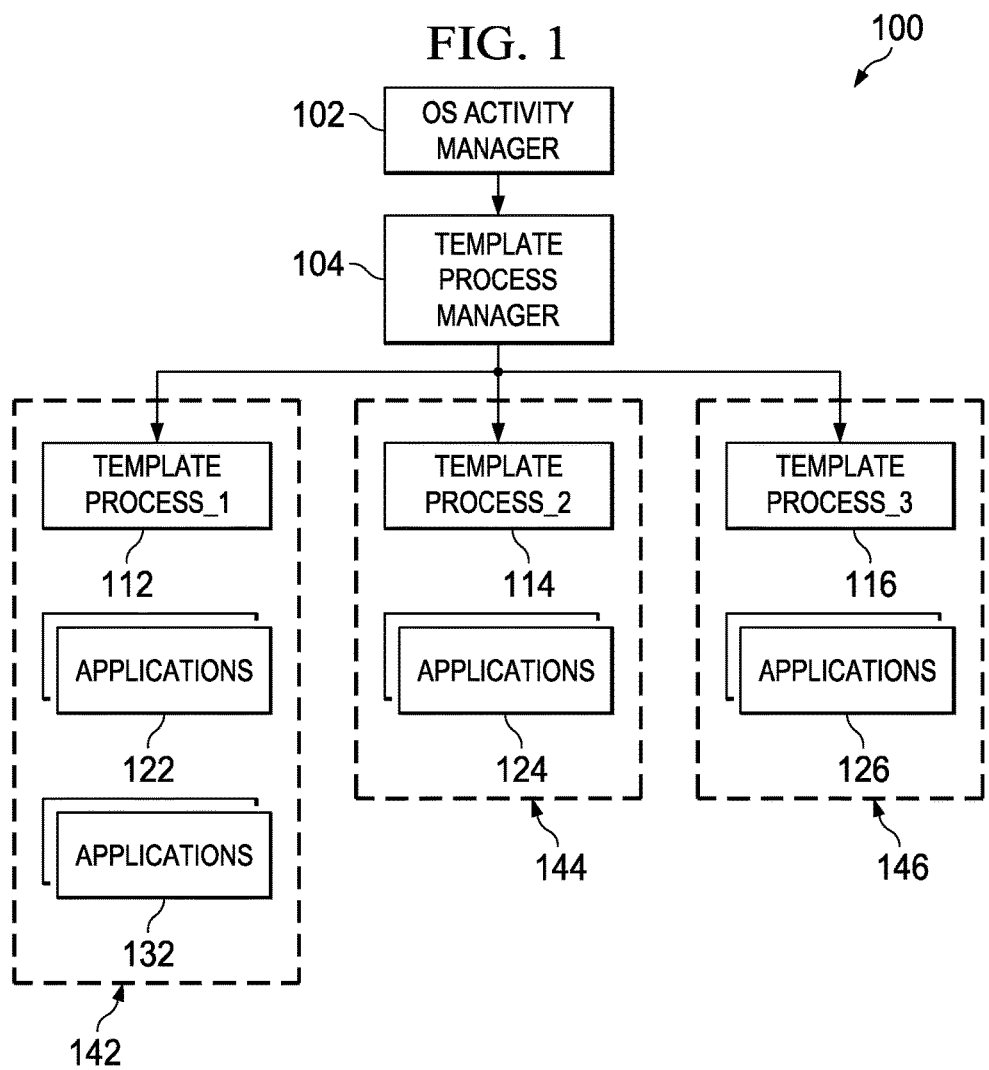
FIG. 1 is a schematic diagram showing an example application launching system.

In some implementations, an operating system operating on an electronic device, e.g., a user equipment (UE), can use a template process to launch an application. In some cases, the template process starts when the operating system is booted and common framework codes and resources, e.g., activity themes, are loaded. To launch a new application, the system forks the template process, and then loads and runs the application's code in the forked process. This approach enables most of the random access memory (RAM) pages allocated for framework codes and resources to be shared across all applications because they are forked from the same template process. Examples of the template process include Zygote.

In the template process launch method, many components of the application frameworks can be loaded and pre-initialized before the application is launched. When a new application is launched, the template process simply forks itself. Therefore, the already loaded and initialized frameworks can be quickly duplicated. After the launch, only the application-specific code remains to be loaded and initialized in the process. Because the template process and the applications launched by the template process share a large amount of memory, because of the operating system Copy On Write (COW) feature, their combined memory footprint remains relatively small.

In some cases, the memory sharing feature of the template process launching method may be subject to attacks. For example, an attacker can learn a great deal about the address space of a process they would like to attack, such as the operating system server, by examining another process, e.g., an application process that is created by the attacker because these processes share the same memory layout. An example of this type of attack includes a Return Oriented Programming (ROP) attack.

In a ROP attack, an attacker can work around Data Execution Protection (DEP) by using a process's own code against it. For example, a process's code being subverted can be loaded into an ad hoc virtual machine (VM). The VM's instruction sequence can be determined by a series of return addresses placed on the stack. In some cases, the addresses can be placed on the stack through buffer overflow. The VM can execute operations, sometimes referred to as "gadgets," which is the combination of a needed instruction followed by a return. In some cases, the attacker can find these gadgets in the existing executable code. The right combination of gadgets is Turing complete because they offer a full processing functionality. The attacker can use the ROP attack to gain control over a process on a device that operates with elevated privileges, e.g., a system process.

In some cases, the ROP attacks can be prevented by scrambling the memory layout associated with each process. This approach may make it statistically unlikely that an attacker can find the gadgets they are looking for within a reasonable amount of time. Therefore, this approach may prevent the attacker from inferring the address space of one process by analyzing the address space of another process. Examples of the scrambling method include the Address Space Layout Randomization (ASLR) method. In an ASLR method, an application can be assembled from object files compiled as Position Independent Code (PIC) that may be located anywhere in memory. Therefore, when the application is launched, the operating system can randomly locate the position independent objects in memory.

However, if an operating system uses the template process method to launch an application, the operating system may not use the ASLR. In some cases, the operating system may randomize the memory space once at the first boot from the factory, the first boot after the over-the-air (OTA) download, or a combination thereof. But the operating system may then use the same address space for all the subsequent applications launched by the template process. Therefore, the likelihood that an attacker can find the gadgets they are looking for to successfully wage a ROP attack is greatly increased.

In some cases, to provide additional security against ROP attacks, multiple template processes can be used to launch applications. In some cases, a plurality of process classes is configured. Each of the plurality of process classes includes one or more applications. In some cases, the process classes can be configured based on the types, sources, executing environments, security requirements, or other properties of applications in the process classes. For example, the process classes can include a system class, an enterprise class, and a personal class. Each of the process classes is configured to be associated with a template process that launches the applications in the respective process class. Each template process is associated with a different randomized memory layout. Therefore, while an attacker can use an application to deduce the address space for other applications in the same process class, the attacker cannot learn the address space of applications in other process classes using the same application.

Figure 2:
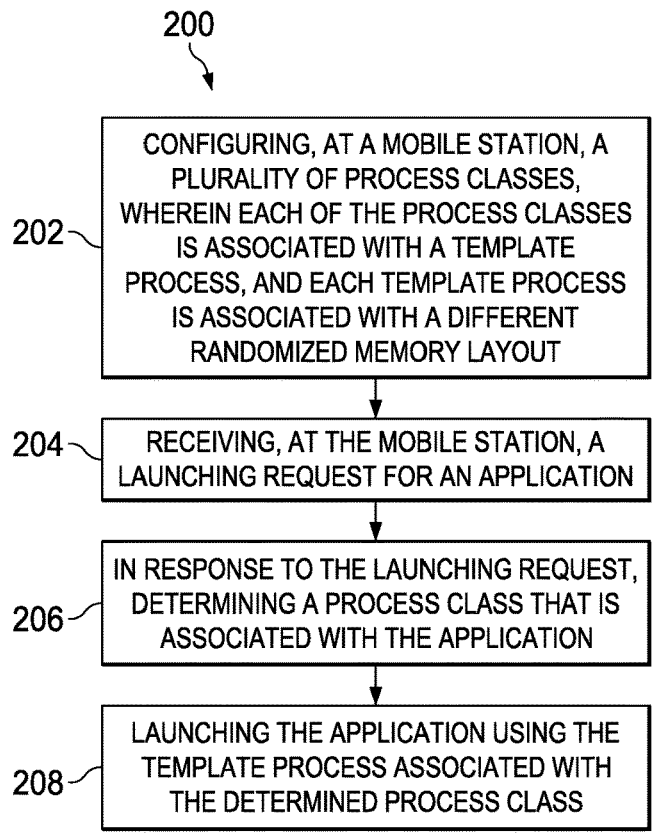
FIG. 2 is a flowchart showing an example process for launching an application.

In some cases, the security can be further improved by setting a predetermined threshold for the number of applications that can be launched by a template process. When the threshold is reached, a different template process is generated with a different randomized memory layout. This approach further reduces the number of applications that share the same memory space, and therefore reduces the risks of the ROP attacks. FIGS. 1-2 and associated descriptions provide additional details of these implementations.

FIG. 1 is a schematic diagram showing an example application launching system 100 that launches applications using multiple template classes. The example application launching system 100 includes an operating system activity manager 102, a template process manager 104, and process classes 142, 144, and 146.

The operating system activity manager 102 represents an application, set of applications, software, software modules, hardware, or combination thereof that can be configured to manage the lifecycle of applications and services running in the operating system. In some cases, the operating system activity manager 102 can receive a request to launch an application, and pass the request to the template process manager 104.

The template process manager 104 represents an application, set of applications, software, software modules, hardware, or combination thereof that can be configured to manage the operations of the template processes. In some cases, the template process manager 104 can receive a launch request for an application from the operating system activity manager 102, determine to which process class the application belongs, determine the template process that is associated with the process class, and send the launch request to the template process for launching the process. In some cases, the template process manager 104 can also determine whether the number of applications launched by a template process has reached a predetermined threshold and generate a replacement template process to replace the template process. In some cases, the template process manager 104 can manage a template process pool and select a template process in the template process pool as the replacement template process. FIG. 2 and associated descriptions provide additional details of these implementations.

As shown in FIG. 1, the example application launching system 100 includes process classes 142, 144, and 146. In some cases, the process classes, e.g., the process classes 142, 144, and 146, can be defined based on the sources, executing environments, security requirements, or other properties of the applications in the respective process class. For example, the process class 142 can be a system class. The process class 142 can include system applications for the UE. Examples of the system applications include a user interface of the operating system, e.g., a window manager, a status bar. The process class 144 can be an enterprise class. The process class 144 can include applications that are installed, configured, or managed by an enterprise associated with a user of the UE, e.g., an employer of the user. Examples of the enterprise applications include an enterprise mail application, an enterprise contact management application, an enterprise file sharing application. The process class 146 can be a personal class. The process class 146 can include applications that are installed, configured, or managed by the user. Examples of the personal applications include games and personal applications created by third parties. In some cases, an attacker is more likely to have access to a personal application. Therefore, grouping system applications and enterprise applications into process classes that are different than the personal class may prevent the attacker from learning the memory space of these applications using a personal application.

Each process class includes one or more applications and a template process that is associated with the respective process class. For example, the process class 142 includes the template process_1 112 and applications 122 and applications 132. The process class 144 includes the template process_2 114 and applications 124. The process class 146 includes the template process_3 116 and applications 126.

A template process, e.g., the template process_1 112, the template process_2 114, and the template process_3 116, represents an application, set of applications, software, software modules, hardware, or combination thereof that can be forked to launch an application. Each template process is associated with a randomized memory layout that is different than the other template processes, and therefore prevents applications from learning the memory layouts across different process classes. In some cases, more than one template processes can be associated with a process class. FIG. 2 and associated descriptions provide additional details of these implementations.

In some cases, a predetermined threshold can be set for the number of applications that can be launched by one template process. When the threshold is reached, a different template process can be used for the process class. For example, applications 122 can be launched by a previous version of the template process_1 112 and applications 132 can be launched by the current version of the template process_1 112. In some cases, the previous and the current version of the template process_1 112 are associated with a different memory layout, and therefore, applications 122 and applications 132 do not share the same memory space. FIG. 2 and associated descriptions provide additional details of these implementations.

FIG. 2 is a flowchart showing an example process 200 for launching an application. The process 200 can be implemented by any type of system or module that launches an application. For example, the process 200 can be implemented by the template process manager 104, the operating system activity manager 102, the template process_1 112, the template process_2 114, the template process_3 116, or a combination thereof shown in FIG. 1. The example process 200 shown in FIG. 2 can also be implemented using additional, fewer, or different operations, which can be performed in the order shown or in a different order.

The example process 200 begins at 202, where a plurality of process classes is configured. Each of the plurality of process classes includes one or more applications. The plurality of process classes can be configured based on the types, sources, executing environments, security requirements, or other properties of the applications. For example, as described previously, the plurality of process classes can be configured to include a system class, an enterprise class, and a personal class.

In some cases, each of the process classes is configured to be associated with a template process. The template process can be configured to launch the applications in the process class. In some cases, a process class can associate with more than one template process. Each template process can be configured to launch a set of applications in the process class. For example, a process class can be configured to associate with two template processes. One is configured to launch 32-bit applications in the process class. The other is configured to launch 64-bit applications in the process class.

In some cases, each template process is associated with a different randomized memory layout. In some cases, an operating system on the UE can include a precomputed system image file for part of the process memory. The system image file can include the position dependent address references for the memory space used by other parts of system. Example of the system image files include a memory heap image, e.g., boot.art, a library file for shared libraries, e.g., webview. In some cases, a different image file indicating a randomized memory layout can be loaded into system memory for each template process.

In some cases, in-memory in-place patching can be used to generate an image for the randomized template process. In some implementations, a randomized number can be generated. The randomized number can be used as a memory address offset. The offset can be added to the memory addresses in the system image to account for the randomization. In some cases, a patchmap can indicate the memory addresses to be changed in the image for the template process. For the in-memory in-place patching method, when the template process is generated, the system image file is loaded into the memory, and the memory addresses in the system image file are then updated based on the patchmap to create an image file for the template process. The in-memory in-place method provides a fast approach to associate a template process with a randomized memory layout that is different from other template processes.

In some cases, file patching can be used to generate an image file randomized for the template process. For the file patching method, instead of loading the system image file directly into the system memory for the template process, the system image file is patched based on the patchmap for the template process prior to loading. The patched image file is then loaded to the system memory for the template process. Because the image file is patched before loading, the operating system can retain the memory address offset used by the template process. Therefore, this approach may enable the operating system to reuse the memory space that is randomized for the template process.

In some cases, virtual file patching can be used to generate an image file randomized for the template process. For the virtual file patching method, a virtual image file is generated for each template process. The name of the virtual image file can be encoded with the random offset associated with the template process. For example, a file named boot-0x60345000.art indicates a virtual image file generated based on the system boot image file boot.art and a random offset 0x60345000. In some cases, the system may use different means of communicating the random offset. The kernel driver of the operating system can provide a file descriptor for each virtual file, without revealing the file name to other processes. The operating system may not assign physical memory for the virtual files before they are used.

When a template process is generated, the kernel driver can take the system image file without offset of a given page. The kernel driver can patch the image file using the offset as indicated by the virtual file for the template process when copying the given page to a newly assigned physical page. The virtual file method provides a fast implementation because the patching is performed in memory. The virtual file method can also enable the operating system to reuse the memory space that is randomized for the template process because the kernel driver has the record of the offset used by the template process.

In some cases, two template processes may select the same random number for address offset. Therefore, the kernel driver may open the same file for these two template processes. However, each virtual file is assigned a different file descriptor by the operating systems. Therefore, the operating system may consider pages from these files as unique.

The virtual file method can also prevent timing side channel attacks. In some cases, an attacker process may determine whether a page created on-demand is already in the memory based on the time that it takes to read the page out of the memory. Based on the determination, the attacker process can learn the memory randomization process and attack the pages that are stored in memory without randomization. By assigning different file descriptors and treating two independently opened files as unique, the virtual file method can prevent the attacker process from learning whether a page is created on-demand or previously stored in the memory.

From 202, the example process proceeds to 204, where a launch request for an application is received. In some cases, the launch request can be generated by an activity manager of the operating system.

From 204, the example process proceeds to 206, where a process class that is associated with the application is determined in response to the launching request. For example, if the launching request is for a system application, then the system class is determined. If the launching request is for an enterprise application, then the enterprise class is determined. If the launching request is for a personal application, then the personal class is determined.

From 206, the example process 200 proceeds to 208, where the application is launched using the template process associated with the determined process class. For example, if the system class is determined at 206, then the system template process is used to launch the application. If the enterprise class is determined at 206, then the enterprise template process is used to launch the application. If the personal class is determined at 206, then the personal template process is used to launch the application.

In some cases, a predetermined threshold is used to set the number of applications that can be launched by a template process. The predetermined threshold can be different for different template processes. For example, a low number may be used as the threshold for a process class with a high security requirement, e.g., a system template process or an enterprise template process. A high number may be used as the threshold for a process class with a low security requirement, e.g., a personal template process. In some cases, the threshold may be set to infinite.

In some cases, the number of applications that have been launched by a template process are compared with the predetermined threshold. If the number of applications that have been launched by the template process meets the predetermined threshold set for the template process, the template process needs to be re-generated. A template process can be re-generated using one of the methods described previously at 202. The re-generated template process can be associated with a different randomized memory layout than the previous template process for the same process class. Therefore, this approach may limit the number of applications within the process class that shares the knowledge of the memory layout.

In some cases, the re-generation of a template process can be deferred. For example, after a template process launches a new application, the template process may reach the predetermined threshold and therefore needs to be re-generated. Instead of re-generating the template process as soon as the threshold is reached, the re-generation process can be deferred. In some cases, the deferred duration can be configured by the system administrator of the operating system, the user, the manufacturer of the UE, or a combination thereof. In one example, the deferred duration can be set to 1 or 2 seconds. For example, when the predetermined threshold is reached, a preconfigured delay timer starts to run. The delay timer is set to the deferred duration. When the delay timer expires, the template process is re-generated. This approach may reduce the resource competition between the newly launched application and the re-generation process. Therefore, the user experience for the application may be improved.

In some cases, a template process pool can be used. The template process pool can include one or more pre-generated template processes. When the template process for one process class has reached the predetermined threshold, a pre-generated template process in the template process pool can be used for that process class. Using a template process pool can provide one or more advantages. For example, this approach may reduce the resource competition with the newly launched application. This approach can also reduce the delays of launching new applications, because the process class does not have to wait for the new template process to be re-generated before launching a new application. In some cases, the number of template processes in the template process pool can be configured by the system administrator of the operating system, the user, the manufacturer of the UE, or a combination thereof. Once a pre-generated template process is used, a new template process can be created in the pool when resource usage is low. In some cases, as discussed above, the template process pool is shared among the process classes. Alternatively or in combination, a template process pool can be configured for individual process class.

Figure 3:
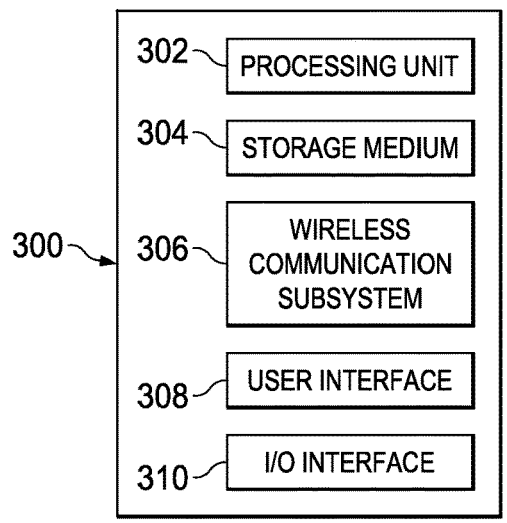
FIG. 3 is a block diagram illustrating an example user equipment (UE) device.

FIG. 3 is a block diagram illustrating an example user equipment (UE) device 300. In some cases, the example application launching system 100 may operate on the UE device 300. A UE may be referred to as mobile electronic device, user device, mobile station, subscriber station, portable electronic device, mobile communications device, wireless modem, or wireless terminal. Examples of a UE may include a cellular phone, personal data assistant (PDA), smart phone, laptop, tablet personal computer (PC), pager, portable computer, portable gaming device, wearable electronic device, or other mobile communications device having components for communicating voice or data via a wireless communication network. The wireless communication network may include a wireless link over at least one of a licensed spectrum and an unlicensed spectrum. The term "UE" can also refer to any hardware or software component that can terminate a communication session for a user. In addition, the terms "user equipment," "UE," "user equipment device," "user agent," "UA," "user device," and "mobile device" can be used synonymously herein.

The illustrated device 300 includes a processing unit 302, a computer-readable storage medium 304 (for example, ROM or flash memory), a wireless communication subsystem 306, a user interface 308, and an I/O interface 310.

The processing unit 302 can include one or more processing components (alternatively referred to as "processors" or "central processing units" (CPUs)) configured to execute instructions related to one or more of the processes, steps, or actions described herein in connection with one or more of the implementations disclosed herein. In some implementations, the processing unit 302 may be configured to generate control information, such as a measurement report, or respond to received information, such as control information from a network node. The processing unit 302 may also be configured to make a Radio Resource Management (RRM) decision such as cell selection/reselection information or trigger a measurement report. The processing unit 302 can also include other auxiliary components, such as random access memory (RAM) and read-only memory (ROM). The computer-readable storage medium 304 can store an operating system (OS) of the device 300 and various other computer-executable instructions, logic or software programs for performing one or more of the processes, steps, or actions described above.

The wireless communication subsystem 306 may be configured to provide wireless communication for voice, data, and/or control information provided by the processing unit 302. The wireless communication subsystem 306 can include, for example, one or more antennas, a receiver, a transmitter, a local oscillator, a mixer, and a digital signal processing (DSP) unit. In some implementations, the subsystem 306 can support multiple-input multiple-output (MIMO) transmissions. In some implementations, the receiver in the wireless communication subsystems 306 can be an advance receiver or a baseline receiver. Two receivers can be implemented with identical, similar, or different receiver processing algorithms.

The user interface 308 can include, for example, one or more of a screen or touch screen (for example, a liquid crystal display (LCD), a light emitting display (LED), an organic light emitting display (OLED), a micro-electromechanical system (MEMS) display), a keyboard or keypad, a trackball, a speaker, and a microphone. The I/O interface 310 can include, for example, a universal serial bus (USB) interface.

In some cases, the example application launching system 100 can operate on a hardware platform other than an UE. For example, the example application launching system 100 can operate on a computer system that does not include a wireless communication subsystem 306.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. A computer can include a processor that performs actions in accordance with instructions, and one or more memory devices that store the instructions and data. A computer may also include, or be operatively coupled to receive data from or transfer data to, or both, one or more mass storage devices for storing data, e.g., magnetic disks, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementation described above should not be understood as requiring such separation in all implementations, and it should be understood that the described program components and systems can generally be integrated together in a single software product or packaged into multiple software products.

Also, techniques, systems, subsystems, and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

While the above detailed description has shown, described, and pointed out the fundamental novel features of the disclosure as applied to various implementations, it will be understood that various omissions, substitutions, and changes in the form and details of the system illustrated may be made by those skilled in the art, without departing from the intent of the disclosure. In addition, the order of method steps are not implied by the order they appear in the claims.

What is claimed is:

1. A method performed by a hardware processor of a mobile device, comprising:
    configuring, at the mobile device, a plurality of process classes, wherein each of the process classes is associated with a template process among a plurality of template processes, each template process of the plurality of template processes is associated with a different randomized memory layout among a plurality of randomized memory layouts, and at least one of the randomized memory layouts is associated with a plurality of applications in a same template process;
    receiving, at the mobile device, a launching request for an application;
    in response to receiving the launching request for the application, determining a process class, among the plurality of process classes, that is associated with the application; and
    in response to determining the process class associated with the application, launching the application through a forked template process associated with the determined process class, wherein other different forked template processes from the plurality of template processes are running on the mobile device.

2. The method of claim 1, wherein the plurality of process classes include a process class for system applications, a process class for enterprise applications, and a process class for personal applications.

3. The method of claim 1, further comprising:
    determining a number of applications that have been launched by the forked template process associated with the determined process class;
    determining that the number of applications that have been launched by the forked template process meets a threshold; and
    in response to determining that the number of applications meets the threshold, associating a second template process with the determined process class, wherein the second template process and the template process are associated with different randomized memory layouts.

4. The method of claim 3, further comprising:
    in response to determining that the number of applications that have been launched by the forked template process meets the threshold, starting a delay timer, wherein the delay timer is set to a deferred duration; and
    when the delay timer expires, generating the second template process.

5. The method of claim 3, wherein the second template process is generated before the forked template process meets the threshold.

6. The method of claim 1, wherein the forked template process is generated using a virtual image file, and a random offset used to randomize a memory layout is shared between the forked template process and a virtual file driver.

7. The method of claim 1, wherein the forked template process is generated by loading a system image file into a system memory of an operating system and patching the system image file based on an address offset while in the system memory.

8. A mobile device, comprising:
    a memory; and
    at least one hardware processor communicatively coupled with the memory and configured to:
        configure, at the mobile device, a plurality of process classes, wherein each of the process classes is associated with a template process among a plurality of template processes, each of the plurality of template processes is associated with a different randomized memory layout among a plurality of randomized memory layouts, and at least one of the randomized memory layouts is associated with a plurality of applications in a same template process;
        receive, at the mobile device, a launching request for an application;
        in response to receiving the launching request for the application, determine a process class, among the plurality of process classes, that is associated with the application; and
        in response to determining the process class associated with the application, launch the application through a forked template process associated with the determined process class, wherein other different forked template processes from the plurality of template processes are running on the mobile device.

9. The mobile device of claim 8, wherein the plurality of process classes include a process class for system applications, a process class for enterprise applications, and a process class for personal applications.

10. The mobile device of claim 8, wherein the at least one hardware processor is further configured to:
    determine a number of applications that have been launched by the forked template process associated with the determined process class;
    determine that the number of applications that have been launched by the forked template process meets a threshold; and
    in response to determining that the number of applications meets the threshold, associate a second template process with the determined process class, wherein the second template process and the template process are associated with different randomized memory layouts.

11. The mobile device of claim 10, wherein the at least one hardware processor is further configured to:
    in response to determining that the number of applications that have been launched by the template process meets the threshold, start a delay timer, wherein the delay timer is set to a deferred duration; and
    when the delay timer expires, generate the second template process.

12. The mobile device of claim 10, wherein the second template process is generated before the forked template process meets the threshold.

13. The mobile device of claim 8, wherein the forked template process is generated using a virtual image file, and a random offset used to randomize a memory layout is shared between the forked template process and a virtual file driver.

14. The mobile device of claim 8, wherein the forked template process is generated by loading a system image file into a system memory of an operating system and patching the system image file based on an address offset while in the system memory.

15. A non-transitory computer-readable medium containing instructions which, when executed, cause a computing device to perform operations comprising:
    configuring, at a mobile device, a plurality of process classes, wherein each of the process classes is associated with a template process among a plurality of template processes, each of the plurality of template processes is associated with a different randomized memory layout among a plurality of randomized memory layouts, and at least one of the randomized memory layouts is associated with a plurality of applications in a same template process;
    receiving, at the mobile device, a launching request for an application;
    in response to receiving the launching request for the application, determining a process class, among the plurality of process classes, that is associated with the application; and
    in response to determining the process class associated with the application, launching the application through a forked template process associated with the determined process class, wherein other different forked template processes from the plurality of template processes are running on the mobile device.

16. The non-transitory computer-readable medium of claim 15, wherein the plurality of process classes include a process class for system applications, a process class for enterprise applications, and a process class for personal applications.

17. The non-transitory computer-readable medium of claim 15, the operations further comprising:
    determining a number of applications that have been launched by the forked template process associated with the determined process class;

determining that the number of applications that have been launched by the forked template process meets a threshold; and in response to determining that the number of applications meets the threshold, associating a second template process with the determined process class, wherein the second template process and the template process are associated with different randomized memory layouts.

18. The non-transitory computer-readable medium of claim 17, the operations further comprising:

in response to determining that the number of applications that have been launched by the forked template process meets the threshold, starting a delay timer, wherein the delay timer is set to a deferred duration; and when the delay timer expires, generating the second template process.

19. The non-transitory computer-readable medium of claim 17, wherein the second template process is generated before the forked template process meets the threshold.

20. The non-transitory computer-readable medium of claim 15, wherein the forked template process is generated using a virtual image file, and a random offset used to randomize a memory layout is shared between the forked template process and a virtual file driver.

* * * * *